United States Patent [19]

Cripps et al.

[11] Patent Number: 5,061,540
[45] Date of Patent: Oct. 29, 1991

[54] SEPARABLE FASTENERS FOR ATTACHMENT TO OTHER OBJECTS

[75] Inventors: Humphrey Cripps, Northampton, United Kingdom; Gerald F. Rocha, Bedford, N.H.; Andrew Morse; William J. Kennedy, both of Manchester, N.H.

[73] Assignee: Velcro Industries B.V., Amsterdam, Netherlands

[21] Appl. No.: 470,128

[22] Filed: Jan. 25, 1990

[51] Int. Cl.$^5$ ............................................. A44B 21/00
[52] U.S. Cl. ................................... 428/100; 428/120; 428/192; 428/182; 428/900; 24/444
[58] Field of Search .............. 428/100, 120, 192, 900, 428/182; 24/442, 444

[56] References Cited

U.S. PATENT DOCUMENTS

| 4,470,857 | 9/1984 | Casalou . | |
|---|---|---|---|
| 4,563,380 | 1/1986 | Black et al. . | |
| 4,673,542 | 6/1987 | Wigner et al. . | |
| 4,693,921 | 9/1987 | Billarant et al. . | |
| 4,710,414 | 12/1987 | Northrup et al. . | |
| 4,726,975 | 2/1988 | Hatch . | |
| 4,792,111 | 12/1988 | Taguchi | 249/83 |
| 4,842,916 | 6/1989 | Ogawa et al. . | |
| 4,931,344 | 6/1990 | Ogawa et al. | 428/100 |

FOREIGN PATENT DOCUMENTS

| 3903847 | 8/1990 | Denmark . |
| 0138724 | 9/1984 | European Pat. Off. . |
| 2412736 | 12/1977 | France . |
| 2405123 | 11/1981 | France . |
| 2423666 | 4/1982 | France . |
| 2609758 | 1/1988 | France . |
| 2624565 | 12/1988 | France . |

Primary Examiner—Alexander S. Thomas
Attorney, Agent, or Firm—Hayes, Soloway, Hennessey & Hage

[57] ABSTRACT

A strip of fastener material adapted for securing to the surface of a foam bun during molding, carries on a first surface an area of outwardly extending elements constituting one half of a touch fastening system. The first surface is arranged to be positioned so that it faces into a trough in a mold wall and this first surface is provided with a pair of elongated flexible sealing lips adjacent the edges of the area. Magnetizable means are also carried by the strip and the fastener strip has portions extending laterally beyond the sealing lips and beyond the edges of the trough in the mold wall.

11 Claims, 3 Drawing Sheets

SEPARABLE FASTENERS FOR ATTACHMENT TO OTHER OBJECTS

BACKGROUND OF THE INVENTION

1. Field of the Invention

This invention relates to an improved apparatus and method for adapting separable fasteners, particularly those of the hook and loop type, for attachment to other objects, particularly such objects as polyurethane foam seat cushions for automobiles, furniture and the like. In this method one portion of a separable fastener is incorporated into the foam object during the molding process for subsequent attachment to another object carrying the mating portion of the separable fastener. The fastener of the invention is easier to produce, store, transport, and use in the mold-in process and provides improved results both during and after the mold-in process.

2. Description of the Prior Art

Hook and loop type separable fasteners, such as those sold by the assignee of this application under the trademark Velcro ®, are well-known and are used to join two members detachably to each other. This type of fastener has two components. Each has a flexible substrate material having one component of the fastening system on the surface thereof. One surface is typically comprised of resilient hooks while the other is comprised of loops, and when the two surfaces are pressed together they interlock to form a releasable engagement.

Separable fasteners have in recent years been used in the manufacture of automobile seats in the attachment of an upholstered seat cover to a polyurethane foam bun. One portion of the separable fastener is incorporated onto the surface of the polyurethane foam bun during the foam molding process. The mating portion of the separable fastener is attached to the seat cover to provide releasable attachment to the foam bun. The separable fastener assembly used in the foam mold for incorporation in the bun surface typically comprises the hooked portion of a separable fastener. This hook portion is characterized by a substrate carrying resilient hooks on one surface. The other surface of the substrate may carry projections to become incorporated into the foam to provide stable attachment of the separable fastener assembly to the foam article. In some assemblies, a magnetizable shim is often attached to the substrate to facilitate placement of the assembly in a trough of the mold cavity wall, which is equipped with magnets. A protective layer, usually in the form of a thin plastic film, may be placed over the resilient hooks to prevent incursion of foam into the hooks during the molding process, since significant foam contamination of the hooks would affect their ability to engage with the mating portion of the fastener attached to the seat cover. The assemblies are usually subjected to ultrasonic flattening at pre-determined lengths in order to mark the assembly for cutting, thus providing finished terminal ends.

The present state of the art relating to the attachment of such fastener means to foamed seat cushions and the like is generally represented by French patents 2,405,123 and 2,423,666 as well as the following U.S. patents:

U.S. Pat. No. 4,470,857, issued Sept. 11, 1984 in the name of Stephen J. Casalou and assigned to R.A. Casalou, Inc.;

U.S. Pat. No. 4,563,380, issued Jan. 7, 1986 in the name of Philip D. Black and assigned to Minnesota Mining and Manufacturing Company;

U.S. Pat. No. 4,673,542, issued June 16, 1987 in the name of Lauren R. Wigner and assigned to General Motors Corporation;

U.S. Pat. No. 4,693,921, issued Sept. 15, 1987 in the name of Patrick J. Billarant and Bruno Queval and assigned to Aplix;

U.S. Pat. No. 4,710,414, issued Dec. 1, 1987 in the name of Walter E. Northrup and Maurice E. Freeman and assigned to Minnesota Mining and Manufacturing Company; and U.S. Pat. No. 4,726,975, issued Feb. 23, 1988 in the name of Richard N. Hatch and assigned to Actief N.V. ABN Trust Co.

Such mold-in separable fastener assemblies presently in use, while proving to be superior means of attaching a seat cover to a foam bun, have presented several problems. One disadvantage of the separable fastener assemblies of the type disclosed in U.S. Pat. No. 4,673,542 is that the thin plastic film layer used to cover the hooks must be removed after the mold-in process, thus requiring an additional and somewhat painstaking step in the manufacture of the foam seat bun. It also requires an additional component in the manufacture of the assembly which must be attached to the separable fastener tape with an adhesive. In addition, an adhesive-backed tape is usually affixed to the film layer to assist in its removal. Other prior art assemblies, including hose disclosed in U.S. Pat. No. 4,726,975, 4,563,380 and 4,693,921 also employ a thin layer of film to prevent the incursion of foam into the projections of the separable fastener portion during mold-in.

French Pat. No. 2,423,666 discloses a system for sealing the edges of the tape in the mold trough by jamming the edges into the trough. It is not believed that this system, which is particularly shown in FIG. 3 of the French Patent, ever achieved any commercial success.

BRIEF SUMMARY OF THE PRESENT INVENTION

In the present invention, there is provided a novel fastener strip which, as in the prior art, carries on a first surface an area of outwardly extending fastener elements, preferably hooks. These fastening elements constitute one-half of a touch fastening system, and these hooks are positioned in a mold trough facing toward the trough interior. In the present invention the strip of carries on the first surface, adjacent to the material carries on the first surface, adjacent to the edges of the area of fastening hooks, continuous flexible sealing lips which extend generally normal to the strip and are longer than the fastening hooks. These sealing lips are jammed against the bottom or sides of the trough in the mold cavity so as to form a flexible seal which is impermeable to the liquid to be foamed in the formation of the seat cushion. In addition, the strip has laterally extending edges which extend well beyond the edges of the trough in the mold and are provided, at their extremities, with foam engaging elements. These foam engaging elements are preferably integral tabs having holes which permit the foam to be formed completely through and around these tabs. The face carrying the hook elements also preferably has transverse sealing means which engage the mold troughs adjacent the ends thereof so as to seal against endwise penetration of the foaming liquid. One type of transverse sealing means is a sealing lip similar to the longitudinal lips, and another type is a thick foam strip. A magnetizable strip is preferably carried on the back of the fastener strip. In a preferred embodiment, this magnetizable strip is corrugated transversely so that it has great flexibility when the composite element is flexed transverse to its longitudinal direction, but is very stiff when attempts are made to flex the strip across its long direction. This transverse stiffness provides for the transmission of strong sealing forces from the magnetizable strip to the longitudinally running sealing lips due to the magnetic attraction of the magnetizable strip by the mold-mounted magnets. Thus the sealing lips are held in tight engagement with the surface of the mold trough.

DETAILED DESCRIPTION OF THE INVENTION

In order to more fully understand the invention, reference should be had to the following detailed description taken in connection with the attached drawings wherein:

FIG. 1. is a diagrammatic, schematic, partially sectional view of one preferred form of the invention;

FIG. 2. is a diagrammatic, schematic, partially sectional view of the invention of FIG. 1 mounted in a trough in a mold wall;

Figure 1:
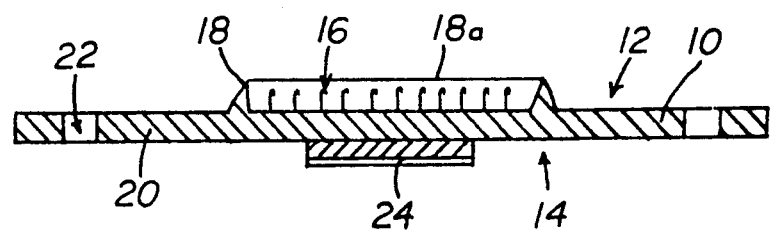
Figure 2:
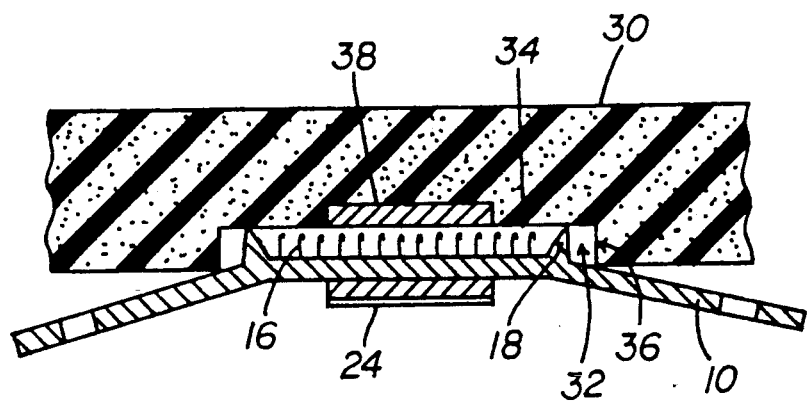
Figure 3:
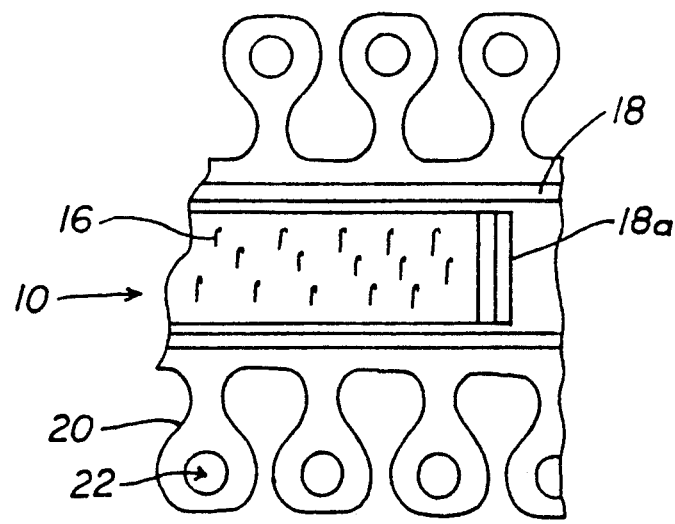
FIG. 3 is a plan view of the invention of FIG. 1.
Figure 5:
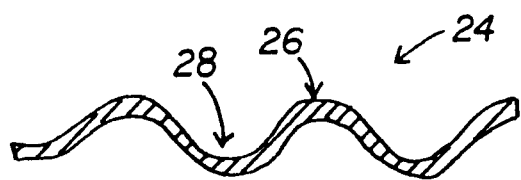
FIG. 5 is a sectional view of the magnetizable strip.

Referring now to FIGS. 1, 2 and 3, there is shown one preferred fastener strip of the present invention, wherein the strip is generally indicated at 10 as having a front surface 12 and a rear surface 14. Mounted on the front surface 12 is an area of fastening elements shown schematically as hooks 16. Flexible sealing lips 18 run transversely along both sides of the area of the hooks 16. A transverse sealing lip 18a may also be provided periodically across the strip. The relationships of the sealing lips 18 and 18a and the area of hooks 16 is shown best in FIG. 3, which is a plan view of the product shown in section in FIG. 1. The strip 10 has laterally extending portions 20 which extend laterally on both sides of the strip beyond the sealing lips 18. These portions have foam engaging elements comprising loops with holes 22 for the purpose of engaging the foam which is formed through and around these laterally extending portions 20. Mounted on the back of the fastener strip is a magnetizable strip 24 which is transversely corrugated as shown in FIG. 5 so that it has peaks 26 and valleys 28. These corrugations run transversely to the length of the strip so that it is flexible when bent transversely to its long dimension, but is very stiff to resist bending across the strip.

Referring now to FIG. 2 in more detail, the strip is shown as held in position by the attraction of a mold magnet 38 in the back of a trough 32 in a mold wall 30. As can be seen, the sealing lips 18 engage a bottom surface 34 of the trough 32, so as to completely seal the hooks 16 against penetration of foam into that portion of the trough 32 containing the hooks 16. The attraction of the magnetizable strip 24 to the mold-mounted magnet 38 is sufficiently strong to bend the tips of flexible sealing lips 18 and form a very tight seal.

Figure 4:
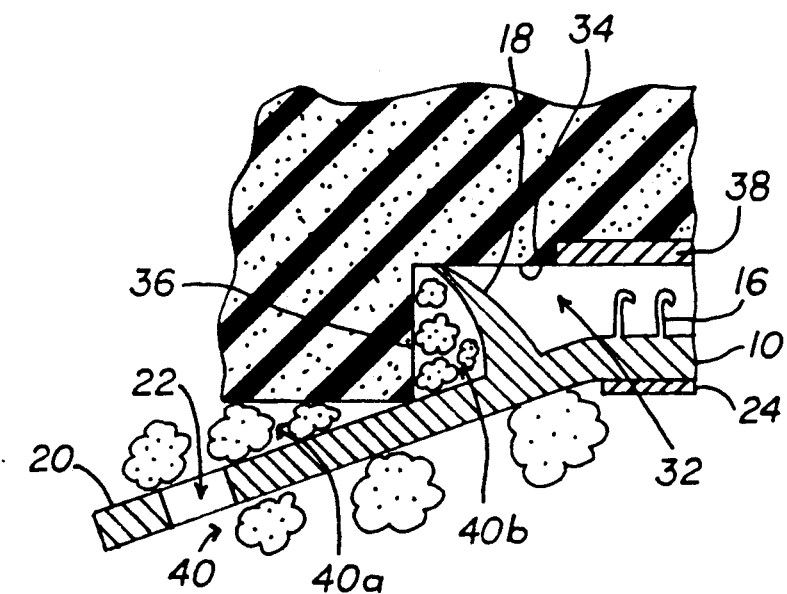
FIG. 4 is an enlarged sectional view similar to FIG. 2 showing the penetration of the foam.

Referring now to FIG. 4 there is shown an enlarged sectional view of the product, wherein a foam material 40 has penetrated through the hole 22 and completely strong mechanical bond to these elements. While some portion of the foam is shown as passing from the area 40A to the volume 40B between the sealing lip 18 and the vertical edge 36 of the trough 32, the sealing lip 18 prevents entry of any appreciable amount of this foam into the portion of the trough 32 facing the hooks 16. Thus, the foam provides strong mechanical bond to the fastener strip, but is completely sealed from the hooks 16. When the foamed cushion of the cured foam is removed from the mold, no further treatment of the product is required. The hooks are all free of foam and ready to engage the matching fastener elements on the seat cover.

In a preferred form of the invention, the strip is made by extrusion, particularly as described in Fischer Pat. No. 4,794,028 owned by the assignee of the present invention. Using this procedure, a plurality of these strips may be produced simultaneously, and by suitable die cutting, the laterally extending areas 20 of one strip can be cut from the laterally extending areas of the adjacent strip. The lips 18 are preferably formed at the time of initial extrusion, although they can be formed later by thermal deformation. The transverse strips of sealing lips 18A are preferably formed after initial extrusion of the product by ultrasonic formation or the like. At this time, the ends of each strip segment may be treated, such as by flattening the hook areas and cutting appropriate tabs in the ends of each fastener element, if desired. In one preferred form of the invention the material of the fastener strip is polypropylene and the magnetizable strip is made from steel 0.003 –0.004 inch thick which is corrugated to give a crimp amplitude of about 0.032 inch with 10 crimps per inch.

Figure 6:
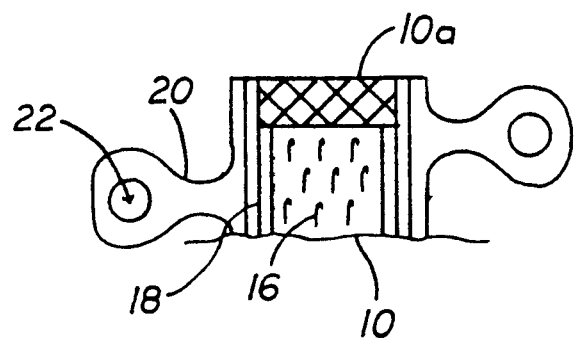
FIG. 6 is a plan view of another preferred form of the invention.
Figure 7:
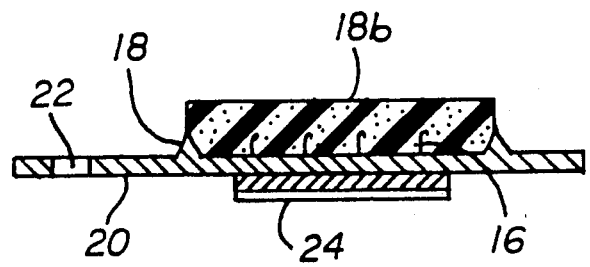
FIG. 7 is a sectional view of FIG. 6 taken along the line 7—7 of FIG. 6.

Referring now to FIGS. 6 and 7, there is illustrated another preferred form of the invention which is particularly useful for providing fastener strips to be used in mold troughs of different lengths. In this embodiment the initial product is formed as a long strip which is then die cut in the same fashion as described above for FIGS. 1-3. Thereafter, the strip is cut to the exact length of the mold trough and the end seal is provided by securing to the hook area at each end a piece of foam 18b which is considerably thicker than the height of the lips 18 and which spans the space between these lips 18. This foam is sufficiently compressible (to less than the height of the lips) so that it does not interfere with the tight deforming engagement between the end of the lips 18 and the bottom 34 of the mold trough 32 under the attractive force of the mold-mounted magnets 38. The compressed foam at each end completely seals each end against penetration by the foaming liquid.

In the preferred form of the invention, as illustrated in FIGS. 6 and 7, the substrate (10) is extruded from poly(-propylene) with a base thickness measured as 0.020 inches. The hooks (16) are 0.065 inches high, measured from the bottom of the substrate, and the lips (18) range between 0.105 and 0.120 inches high tapering from a base of 0.012 inches wide to the flexible tip. These lips will deflect by approximately 0.011 inches under force of approximately 0.5 190 /inch of strip applied over the entire width of the strip. The center portion carrying the hooks (16) deflects to touch the face of the mold under this pressure and at the center line the back of the part is 0.065 inches above the base. The tabs (20) are 0.750 inches long and the foam piece (18b) is made of a laminated poly(urethane) foam sheet having a density of approximately 3 #/sq. foot laminated to a loop tricot fabric (a combination laminate sold by Velcro as "Vel-Foam R"). This "Vel-Foam" will compress from its original thickness of 0.132 inches (measured under a pressure of 0.1 #/sq. inch) to a thickness of 0.104 inches under a pressure of 0.4 #/sq. inch). The foam piece is secured to the substrate by engagement of the loops on the face of the "Vel-Foam", which bond is accomplished by penetration of the hooks (16) into the loops on the face of the loop fabric laminated to the urethane foam sheet.

While a preferred embodiment of the invention concerns manufacture of the structure of the fastening element as a could be formed independently and be united permanently such as by ultrasonic bonding, the use of hot melt adhesives, etc.

We claim:

1. In a strip of unitary extruded fastener material adapted for securing to the surface of a foam bun during molding, wherein the fastener strip carries on a first surface an area of outwardly extending integral elements constituting hooks for a touch fastening system, and wherein said first surface is arranged to be positioned so that it faces into a trough in a mold wall, the improvement wherein the strip of material carries on said first surface a pair of integral elongated flexible sealing lips adjacent the edges of said area, magnetizable means secured to a second surface of the strip, the fastener strip having integral portions extending laterally beyond the sealing lips and beyond the edges of the trough in the mold wall, and transverse sealing means extending across the strip at predetermined locations.

2. The fastener strip of claim 1, wherein said transverse sealing means is an integrally formed transverse flexible sealing lip.

3. The fastener strip of claim 1 wherein said transverse sealing means is a separate piece of foam secured to that surface of the strip containing the hooks, said foam piece spanning the distance between said flexible lips.

4. The fastener strip of claim 3, wherein the foam piece extends above the lips and is compressible by the attraction of a mold-mounted magnet to a height less than the height of the lips.

5. The fastener strip of claim 14 wherein the foam piece is secured to the first surface by said hooks.

6. In a strip of fastener material adapted for securing to the surface of a foam bun during molding, wherein the fastener strip carries on a first surface an area of outwardly extending hook elements constituting one half of a touch fastening system, and wherein said first surface is arranged to be positioned so that it faces into a trough in a mold wall, the improvement wherein the strip of material carries on said first surface a sealing means adjacent the edges of said area, said sealing means comprising a piece of foam thicker than said hook elements and secured to said strip by said hook elements, magnetizable means carried by the strip, the fastener strip having portions extending laterally beyond the sealing means and beyond the edges of the trough in the mold wall.

7. In a strip of fastener material adapted for securing to the surface of a foam bun during molding, wherein the fastener strip carries on a first surface an area of outwardly extending elements constituting one half of a touch fastening system, and wherein said first surface is arranged to be positioned so that it faces into a trough in a mold wall, the improvement wherein the strip of material carries on said first surface a pair of integrally formed elongated flexible sealing lips adjacent the edges of said area, magnetizable means carried by the strip, the fastener strip having portions extending laterally beyond the sealing lips and beyond the edges of the trough in a mold wall, the magnetizable means carried by the strip being a magnetizable metal strip carried on the back of the fastener strip having corrugations running transversely of the metal strip.

8. In a strip of fastener material adapted for securing to the surface of a foam bun during molding, wherein the fastener strip carries on a first surface an area of outwardly extending elements constituting one half of a touch fastening system, and wherein said first surface is arranged to be positioned so that it faces into a trough in a mold wall, the improvement wherein the strip of material is molded and carries on said first surface a pair of integrally formed elongated flexible sealing lips adjacent the edges of said area, magnetizable means carried by the strip, the fastening elements being integrally formed hooks, and the flexible sealing lips being longer than the hooks, the fastener strip having flexible integral foam engaging portions extending laterally beyond the sealing lips and beyond the edges of the trough in the mold wall, the magnetizable means carried by the strip being a magnetizable metal strip carried on the back of the fastener strip, the magnetizable strip having corrugations running transversely of the metal strip.

9. In a strip fastener material adapted for securing to the surface of a foam bun during molding, wherein the fastener strip carries on a first surface an area of outwardly extending elements constituting one half of a touch fastening system, and wherein said first surface is arranged to be positioned so that it faces into a trough in a mold wall, the improvement wherein the strip of material carries on said first surface a pair of elongated flexible sealing lips adjacent the edges of said area, magnetizable means carried by the strip, the fastener strip having portions extending laterally beyond the sealing lips and beyond the edges of the trough in the mold wall, said laterally extending portions including relatively flexible foam engaging elements, having enlarged ends which can be buried in the foam, said enlarged ends having openings therein.

10. In a strip fastener material adapted for securing to the surface of a foam bun during molding, wherein the fastener strip carries on a first surface an area of outwardly extending elements constituting one half of a touch fastening system, and wherein said first surface is arranged to be positioned so that it faces into a trough in a mold wall, the improvement wherein the strip of material carries on said first surface a pair of elongated flexible sealing lips adjacent the edges of said area, magnetizable means carried by the strip, the fastener strip having portions extending laterally beyond the sealing lips and beyond the edges of the trough in the mold wall, said laterally extending portions including relatively flexible foam engaging elements, having enlarged ends which can be buried in the foam, each end of the strip having a transverse foam piece which spans the lips at the ends of the trough.

11. The fastener strip of claim 10, wherein the foam piece extends above the lips and is compressible by the attraction of a mold-mounted magnet to a height less than the height of the lips.

* * * * *

UNITED STATES PATENT AND TRADEMARK OFFICE
CERTIFICATE OF CORRECTION

PATENT NO. : 5,061,540

DATED : October 29, 1991

INVENTOR(S) : Humphrey Cripps, Gerald F. Rocha, Andrew P. Morse and William J. Kennedy It is certified that error appears in the above-identified patent and that said Letters Patent is hereby corrected as shown below:

Claim 5, Col. 5, line 49 change "14" to "4".

Claim 8, Col. 6, line 30 after "magnetizable" insert "metal".

Signed and Sealed this

Sixth Day of April, 1993

Attest:

STEPHEN G. KUNIN

Attesting Officer

Acting Commissioner of Patents and Trademarks